United States Patent
Hong et al.

(10) Patent No.: US 8,089,937 B2
(45) Date of Patent: Jan. 3, 2012

(54) METHOD AND APPARATUS FOR HANDOVER IN MOBILE COMMUNICATION NETWORK INCLUDING SATELLITE NETWORK

(75) Inventors: Tae Chul Hong, Daejeon (KR); Kun Seok Kang, Daejeon (KR); Do Seob Ahn, Daejeon (KR); Ho Jin Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 430 days.

(21) Appl. No.: 12/445,559

(22) PCT Filed: Oct. 17, 2007

(86) PCT No.: PCT/KR2007/005082
§ 371 (c)(1),
(2), (4) Date: Apr. 14, 2009

(87) PCT Pub. No.: WO2008/069434
PCT Pub. Date: Jun. 12, 2008

(65) Prior Publication Data
US 2010/0015972 A1   Jan. 21, 2010

(30) Foreign Application Priority Data
Dec. 7, 2006   (KR) .................. 10-2006-0123869

(51) Int. Cl.
*H04W 4/00* (2009.01)
*H04Q 7/22* (2006.01)
(52) U.S. Cl. ......... 370/331; 370/329; 455/428; 455/436
(58) Field of Classification Search .......... 370/329–350; 455/422.1–428, 436–442; 380/247–250
See application file for complete search history.

(56) References Cited

U.S. PATENT DOCUMENTS
5,649,290 A * 7/1997 Wang .................... 370/332
(Continued)

FOREIGN PATENT DOCUMENTS
EP   1376897   1/2004
(Continued)

OTHER PUBLICATIONS

Zhao, W. et al., "Internetwork handover performance analysis in a GSM-satellite integrated mobile communication system", IEEE Journal on Selected Areas in Communications, vol. 15, No. 8, Oct 1997, pp. 1657-1671.

(Continued)

*Primary Examiner* — Afsar M. Qureshi
(74) *Attorney, Agent, or Firm* — Rabin & Berdo, P.C.

(57) ABSTRACT

A method and mobile communication terminal for handover in a mobile communication network including at least one mobile communication base station and a communication satellite. The handover method includes the steps of: (a) calculating a signal power received from a currently communicating mobile communication base station among the at least one mobile communication base station, (b) calculating a signal power received from each of the communication satellite and the at least one mobile communication base station except the base station of step (a), (c) selecting a mobile communication base station having the highest among the calculated signal powers except the signal power received from the communication satellite and the signal power received from the base station of step (a), and (d) when the signal power calculated in step (a) is below a predetermined minimum handover power, a difference between the signal power of the selected mobile communication base station and the signal power calculated in step (a) is equal to or below a first terrestrial handover sensitivity, and there is no other mobile communication base station capable of communicating with the mobile communication terminal, performing handover to the communication satellite.

17 Claims, 7 Drawing Sheets

U.S. PATENT DOCUMENTS

| | | | |
|---|---|---|---|
| 5,659,878 A * | 8/1997 | Uchida et al. | 455/426.1 |
| 6,370,126 B1 | 4/2002 | De Baere et al. | |
| 2005/0260948 A1 | 11/2005 | Regulinski et al. | |

FOREIGN PATENT DOCUMENTS

| | | |
|---|---|---|
| JP | 07154859 | 6/1995 |
| JP | 07-226973 | 8/1995 |
| KR | 20060008865 | 1/2006 |
| KR | 2006-0040127 | 5/2006 |
| KR | 2006-0040128 | 5/2006 |
| WO | WO-2004/105256 | 12/2004 |
| WO | WO-2005-032170 | 4/2005 |

OTHER PUBLICATIONS

Leo, M. et al., "Intersegment handover between terrestrial and satellite segments: analysis and performance evaluation through simulation", IEEE Transactions on Vehicular Technology, vol. 50, No. 3, May 2001, pp. 750-766.

* cited by examiner

METHOD AND APPARATUS FOR HANDOVER IN MOBILE COMMUNICATION NETWORK INCLUDING SATELLITE NETWORK

TECHNICAL FIELD

The present invention relates to a method and apparatus for handover in a mobile communication network including a satellite network.

More particularly, the present invention relates to a handover method required for providing seamless service to a user when a satellite communication system provides service in a dead zone of a terrestrial communication system. The method prevents frequent handover between the satellite communication system and the terrestrial communication system, thereby avoiding service quality deterioration due to long signaling delay of the satellite communication system.

The present invention has been produced from the work supported by the IT R&D program of MIC (Ministry of Information and Communication)/IITA (Institute for Information Technology Advancement) [2005-S-014-02, Development of satellite IMT-2000+ technology] in Korea.

BACKGROUND ART

In a conventional terrestrial mobile communication system, only handover in the same system is considered among various handover cases. Thus, a handover method is designed in consideration of a case in which a user having a mobile communication terminal moves between cells of the same system or between sectors in one cell. Thus, observing received signal powers from base stations or sectors, handover is performed when the received signal power of a base station or sector is higher than that of a currently communicating base station or sector. Lately, various communication systems, such as Institute of Electrical and Electronics Engineers (IEEE) 802.11a/b/g wireless Local Area Network (LAN), Wireless Broadband (WiBro), third generation mobile communication, etc., coexist with each other, which require handover technology between different systems as well as conventional handover technology within the same system. Therefore, standardization for handover between different systems, such as media independent handover of IEEE 802.21, is also in progress.

When handover is performed between a terrestrial communication system and a satellite communication system, a much longer signaling delay occurs than in conventional handover between terrestrial communication systems. Therefore, a successful packet transfer rate may be reduced due to packet transfer delay or irregular packet transfer in data communication using Transmission Control Protocol (TCP), and momentary call drop, etc. may occur in voice communication.

The present invention is for preventing the above problems that may be caused when handover is performed between a terrestrial communication system and a satellite communication system.

DISCLOSURE OF INVENTION

Technical Problem

The present invention is directed to a method and mobile communication terminal for handover in a mobile communication network including a communication satellite.

The present invention is also directed to reflecting received signal power characteristics of a satellite communication system and efficiently performing handover in the dead zone of a terrestrial communication system in order to prevent problems that may occur when handover is performed between the terrestrial communication system and the satellite communication system.

Technical Solution

One aspect of the present invention provides a handover method for a mobile communication terminal in a mobile communication network including at least one mobile communication base station and a communication satellite, the handover method comprising the steps of: (a) calculating a signal power received from a currently communicating mobile communication base station among the at least one mobile communication base station; (b) calculating a signal power received from each of the communication satellite and the at least one mobile communication base station except the base station of step (a); (c) selecting a mobile communication base station having the highest among the calculated signal powers except the signal power received from the communication satellite and the signal power received from the base station of step (a); and (d) when the signal power calculated in step (a) is below a predetermined minimum handover power, a difference between the signal power of the selected mobile communication base station and the signal power calculated in step (a) is equal to or below a first terrestrial handover sensitivity, and there is no other mobile communication base station capable of communicating with the mobile communication terminal, performing handover to the communication satellite.

The handover method may further comprise the step of not performing handover when the signal power of step (a) is equal to or above a maximum handover power. The handover method may further comprise the step of reattempting a call when the signal power of step (a) is equal to or below a call-enabling power. The handover method may further comprise the step of performing handover to the mobile communication base station of step (c) when the signal power of step (a) is equal to or above the predetermined minimum handover power, and the difference between the signal power of the mobile communication base station selected in step (c) and the signal power of step (a) is equal to or above a second terrestrial handover sensitivity.

In addition, the first terrestrial handover sensitivity may be equal to or below the second terrestrial handover sensitivity. The existence of another mobile communication base station capable of communicating with the mobile communication terminal may be checked by determining whether a variation of the powers calculated in step (b) is equal to or above a predetermined reference variation, and the power calculated in step (b) is equal to or above the call-enabling power. The predetermined reference variation may be set to a value larger than 0. The first and second terrestrial handover sensitivity may be previously determined together with a handover hysteresis margin used by a terrestrial base station to determine handover.

Another aspect of the present invention provides a handover method for a mobile communication terminal in a mobile communication network including at least one mobile communication base station and a communication satellite, the handover method comprising the steps of: (a) calculating a signal power received from the communication satellite; (b) calculating a signal power received from each of the at least one mobile communication base station; (c) selecting mobile communication base stations having a higher signal power than a minimum handover power among the calculated signal powers; (d) selecting a mobile communication base station having the highest among the received signal powers of the selected mobile communication base stations; and (e) when the signal power of the mobile communication base station of step (d) is equal to or below a maximum handover power, a plurality of mobile communication base stations are selected in step (c), and a difference between the signal power of the mobile communication base station selected in step (d) and the signal power of step (a) is equal to or above a second terrestrial handover sensitivity, performing handover to the mobile communication base station of step (d).

When the received power of the mobile communication base station of step (d) is equal to or above the maximum handover power, handover may be performed to the mobile communication base station of step (d).

Still another aspect of the present invention provides a mobile communication terminal for performing handover to a communication satellite and a mobile communication base station in a mobile communication network including at least one mobile communication base station and the communication satellite, the mobile communication terminal comprising: a communication power calculator for calculating a signal power received from a currently communicating mobile communication base station among the at least one mobile communication base station; a signal power calculator for calculating a signal power received from each of the communication satellite and the at least one mobile communication base station except the communicating mobile communication base station; a base station selector for selecting a mobile communication base station having a highest signal power among the powers calculated by the signal power calculator except the signal power received from the communication satellite and the power calculated by the communication power calculator; and a handover unit for performing handover to the communication satellite when the signal power calculated by the communication power calculator is below a predetermined minimum handover power, a difference between the signal power of the mobile communication base station selected by the base station selector and the signal power calculated by the communication power calculator is equal to or below a first terrestrial handover sensitivity, and there is no other mobile communication base station capable of communicating with the mobile communication terminal.

When the signal power calculated by the communication power calculator is equal to or above a maximum handover power, handover may not be performed. When the signal power calculated by the communication power calculator is equal to or below a call-enabling power, a call may be reattempted. When the signal power calculated by the communication power calculator is equal to or above the predetermined minimum handover power, and the difference between the signal power of the mobile communication base station selected by the base station selector and the signal power calculated by the communication power calculator is equal to or above a second terrestrial handover sensitivity, handover may be performed to the mobile communication base station selected by the base station selector.

In addition, the existence of another mobile communication base station capable of communicating with the mobile communication terminal may be checked by determining whether a variation of the powers calculated by the signal power calculator is equal to or above a predetermined reference variation, and whether the power calculated by the signal power calculator is equal to or above the call-enabling power.

Yet another aspect of the present invention provides a mobile communication terminal for performing handover to a communication satellite and a mobile communication base station in a mobile communication network including at least one mobile communication base station and the communication satellite, the mobile communication terminal comprising: a communication power calculator for calculating a signal power received from the communication satellite; a signal power calculator for calculating a signal power received from each of the at least one mobile communication base station; a candidate base station selector for selecting mobile communication base stations having a signal power equal to or above a minimum handover power among the signal powers calculated by the signal power calculator; a highest power base station selector for selecting a mobile communication base station having the highest among the received signal powers of the mobile communication base stations selected by the candidate base station selector; and a handover unit for performing handover to the mobile communication base station selected by the highest power base station selector when the received power of the mobile communication base station selected by the highest power base station selector is equal to or below a maximum handover power, a plurality of mobile communication base stations are selected by the candidate base station selector, and a difference between the signal power of the mobile communication base station selected by the highest base station selector and the signal power calculated by the communication power calculator is equal to or above a second terrestrial handover sensitivity.

When the received power of the mobile communication base station selected by the highest power base station selector is equal to or above the maximum handover power, handover may be performed to the mobile communication base station selected by the highest power base station selector.

Advantageous Effects

According to the present invention, it is possible to provide a method and mobile communication terminal for handover in a mobile communication network including a communication satellite.

In addition, it is possible to provide a method of reflecting received signal power characteristics of a satellite communication system, which is different from a conventional terrestrial communication system, and determining handover according to a received signal power for interworking of a satellite communication system and a terrestrial communication system. Furthermore, it is possible to provide a method and apparatus for preventing frequent handover between a satellite communication system and a terrestrial communication system in order to avoid performance deterioration due to long delay time caused by handover.

DESCRIPTION OF MAJOR REFERENCE NUMERALS IN THE ABOVE FIGURES

201: Coverage of a communication satellite
203: Coverage of terrestrial base station B
205: Coverage of terrestrial base station A
211: Movement path of a terminal

MODE FOR THE INVENTION

Hereinafter, exemplary embodiments of the present invention will be described in detail. However, the present invention is not limited to the exemplary embodiments disclosed below, but can be implemented in various forms. The following exemplary embodiments are described to enable those of ordinary skill in the art to embody and practice the invention.

Figure 1:
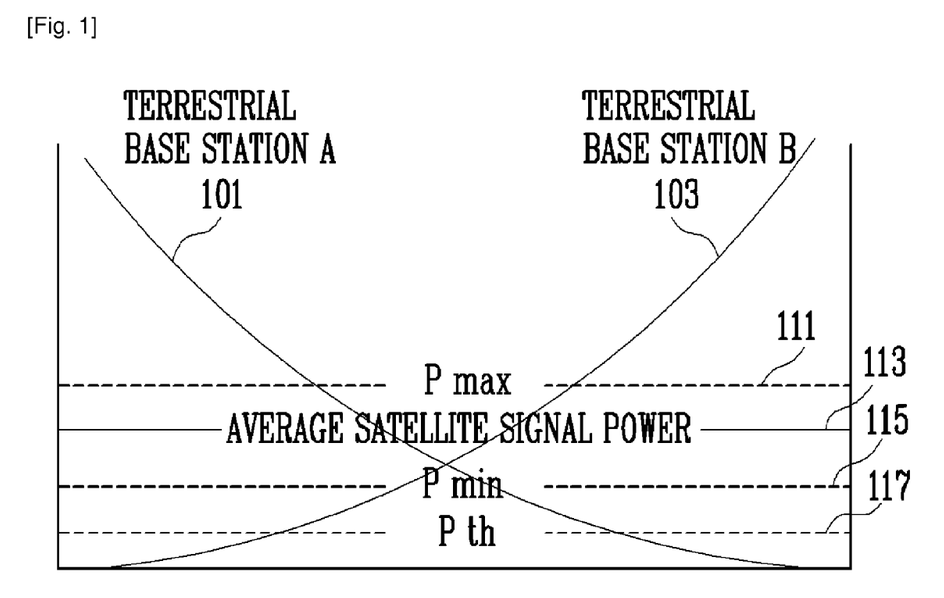
FIG. 1 is a graph showing the level of signal powers including satellite signal powers.

FIG. 1 is a graph showing the level of signal powers including satellite signal powers.

Referring to FIG. 1, the graph showing the level of signal powers according to distance from a base station is similar to a signal power level graph used to describe handover between base stations in a conventional mobile communication network. FIG. 1 does not consider change in signal power level due to fading.

First, assuming that the left vertical axis denotes the position of terrestrial base station A, a curved line 101 denotes the level of signal power that a mobile communication terminal receives from terrestrial base station A according to distance.

Likewise, assuming that the right vertical axis denotes the position of terrestrial base station B, a curved line 103 denotes the level of signal power that a mobile communication terminal receives from terrestrial base station B according to distance.

Here, in a conventional mobile communication network that does not consider handover to a satellite, handover is performed in a section randomly set around a point where the curved lines 101 and 103 cross each other above a communication-enabling power, i.e., a line 117 whose power level is Pth. In other words, in the graph, handover is performed within points where a line 111 denoting the maximum handover power Pmax and a line 115 denoting the minimum handover power Pmin cross the curved lines 101 and 103.

However, since the present invention must take handover to a communication satellite into consideration, the power level of a satellite signal transmitted from a communication satellite is designated by a reference number 113.

As can be seen in FIG. 1, there is almost no change in the power level of a communication satellite with distance, in contrast to a terrestrial base station. This is because the communication satellite is extraordinarily far away compared to the distance between base stations, and thus the difference in received power level according to distance between base stations is relatively minute.

Meanwhile, when handover is processed in consideration of a signal power received from such a communication satellite according to only signal intensity in the same manner as a conventional method, handover from terrestrial base station A to the communication satellite must be performed once at a point where the curved line 101 crosses the line 113, and handover from the communication satellite to terrestrial base station B must be performed again at a point where the line 113 crosses the curved line 103.

Such frequent handover is not recommended, and there is a high probability of data loss or call loss when handover is performed with a communication satellite. Thus, it is recommended to minimize the number of handovers with a communication satellite.

Therefore, cases in which handover is performed to a satellite will be described with reference to the drawings.

Figure 2:
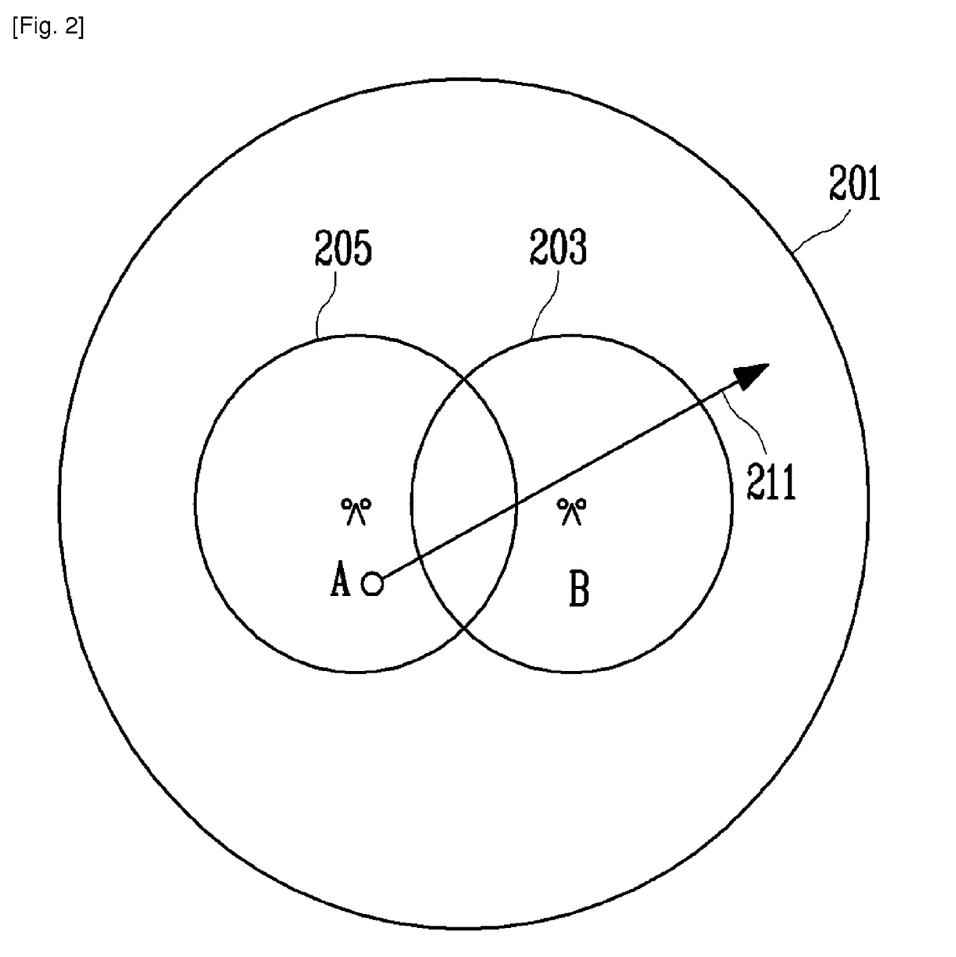
FIG. 2 illustrates the case of exiting the coverage areas of terrestrial base stations.

FIG. 2 illustrates the case of exiting the coverage areas of terrestrial base stations.

In FIG. 2, a case is illustrated in which a user passes through a coverage 205 of terrestrial base station A and a coverage 203 of terrestrial base station B, and exits the coverage areas of terrestrial base stations A and B, while communicating using a mobile communication terminal. In this case, terrestrial handover is performed once between terrestrial base station A and terrestrial base station B, and then handover between terrestrial base station B and a communication satellite may be performed when the user moves out of the communication coverage 203 of terrestrial base station B because the user belongs to a coverage 201 of the communication satellite.

In this case, along a path 211 of the mobile communication terminal, handover is performed in order of terrestrial base station A, terrestrial base station B and the communication satellite.

Figure 3:
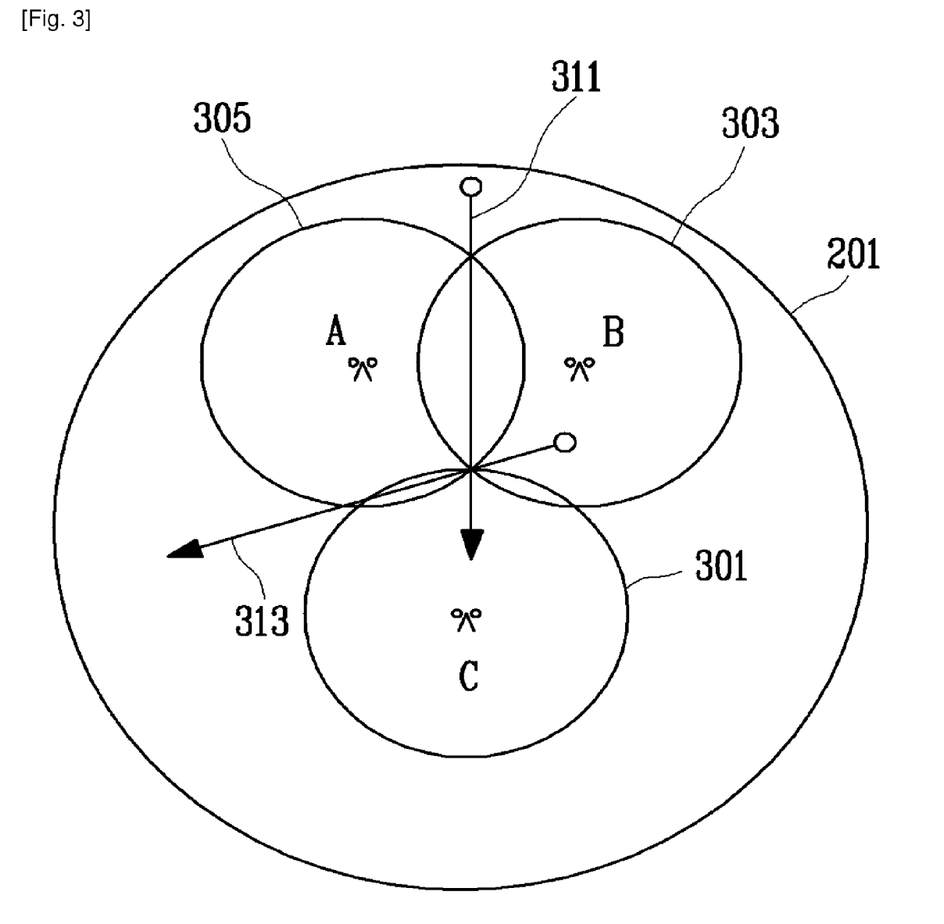
FIG. 3 illustrates cases of entering and exiting the service areas of terrestrial base stations along handover boundaries of the base stations.

FIG. 3 illustrates the case of entering and exiting the service areas of terrestrial base stations along handover boundaries of the base stations.

Referring to FIG. 3, a path 311 indicates movement from outside the coverage areas of terrestrial base stations to a coverage 301 of base station C along the boundary between coverage areas 305 and 303 of base stations A and B. On the other hand, a path 313 indicates movement from the coverage 303 of base station B to outside the coverage areas of terrestrial base stations along the boundary between the coverage areas 305 and 301 of base stations A and C.

In the path 313, as illustrated in FIG. 2, handover is performed between terrestrial base stations in the coverage areas of the terrestrial base stations, and when a mobile communication terminal exits the coverage areas of terrestrial base stations, handover is performed from a terrestrial base station to a communication satellite.

In other words, when the mobile communication terminal is in the coverage 303 of base station B, it communicates with base station B. Subsequently, when the mobile communication terminal moves along the boundary between the coverage areas 305 and 301 of base stations A and C, handover is performed to base station A or C. Finally, when the mobile communication terminal exits the coverage areas of terrestrial base stations, it enters a coverage 201 of the communication satellite, and handover is performed to the communication satellite.

On the other hand, when the mobile communication terminal moves from the coverage 201 of the communication satellite to the coverage 301 of base station C along the boundary between the coverage areas 305 and 303 of base stations A and B, and handover is immediately performed upon entry into the boundary, unnecessary handover may be performed between base station A and base station B. Therefore, it is recommended to keep communicating with the communication satellite and to perform handover from the communication satellite to terrestrial base station C when the terminal enters the coverage 301 of terrestrial base station C. In other words, it is not recommended to perform handover to terrestrial base station A and terrestrial base station B along the path 311.

Figure 4:
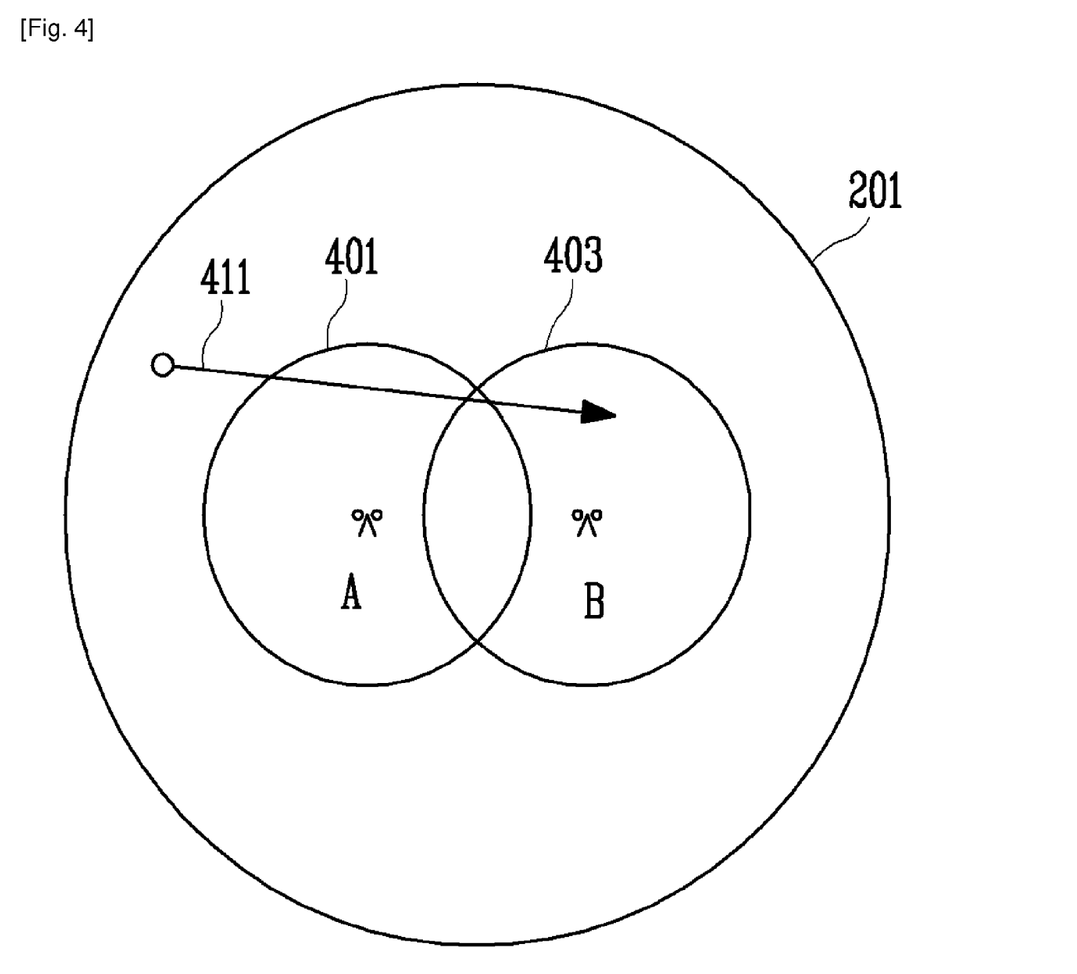
FIG. 4 illustrates the case of entering the coverage areas of terrestrial base stations through the outskirts.

FIG. 4 illustrates the case of entering the coverage areas of terrestrial base stations through the outskirts.

Referring to FIG. 4, a path 411 indicates movement from a coverage 201 of a communication satellite to a coverage 403 of terrestrial base station B through a part of a coverage 401 of terrestrial base station A.

Along the path 411, a mobile communication terminal passes through the outskirts of terrestrial base station A, and the question is whether or not to perform handover to terrestrial base station A. Here, when handover is performed to terrestrial base station A, it may be performed again to the communication satellite because of the low signal power of terrestrial base station A. Therefore, in this case, it is recommended not to perform handover when the mobile communication terminal passes through the coverage 401 of terrestrial base station A in order to reduce the number of unnecessary handovers, but rather to directly perform handover to terrestrial base station B in the coverage 403.

Figure 5:
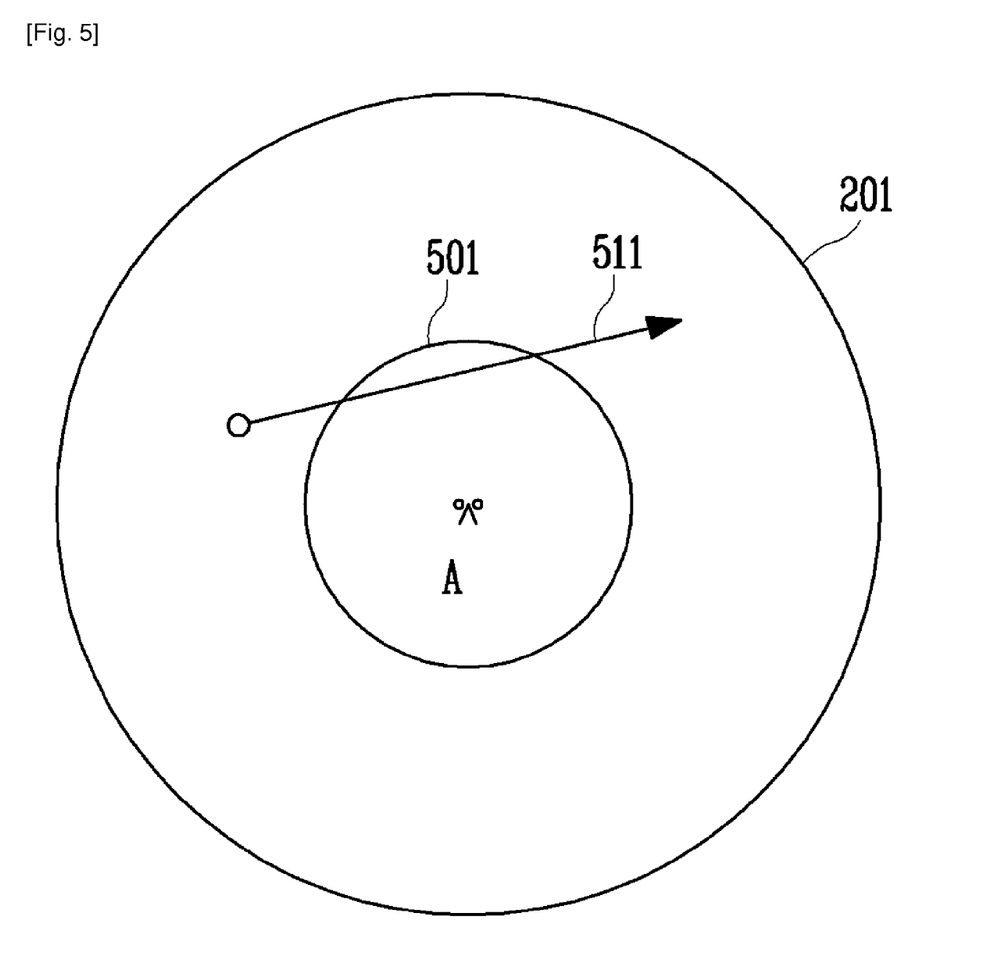
FIG. 5 illustrates the case of passing through the outskirts of a terrestrial base station's coverage.

FIG. 5 illustrates the case of passing through the outskirts of a terrestrial base station's coverage.

Referring to FIG. 5, a path 511 indicates movement from a coverage 201 of a communication satellite to the coverage 201 again through the outskirts of terrestrial base station A's coverage 501.

Also in this case, a mobile communication terminal passes through only the outskirts of terrestrial base station A's coverage 501. Thus, when handover is performed upon entry into the coverage 501 of terrestrial base station A, another handover is required upon exit from the coverage 501. In addition, since signal power is low in the path 511 within the coverage 501, handover to the communication satellite may be frequently performed.

Figure 6:
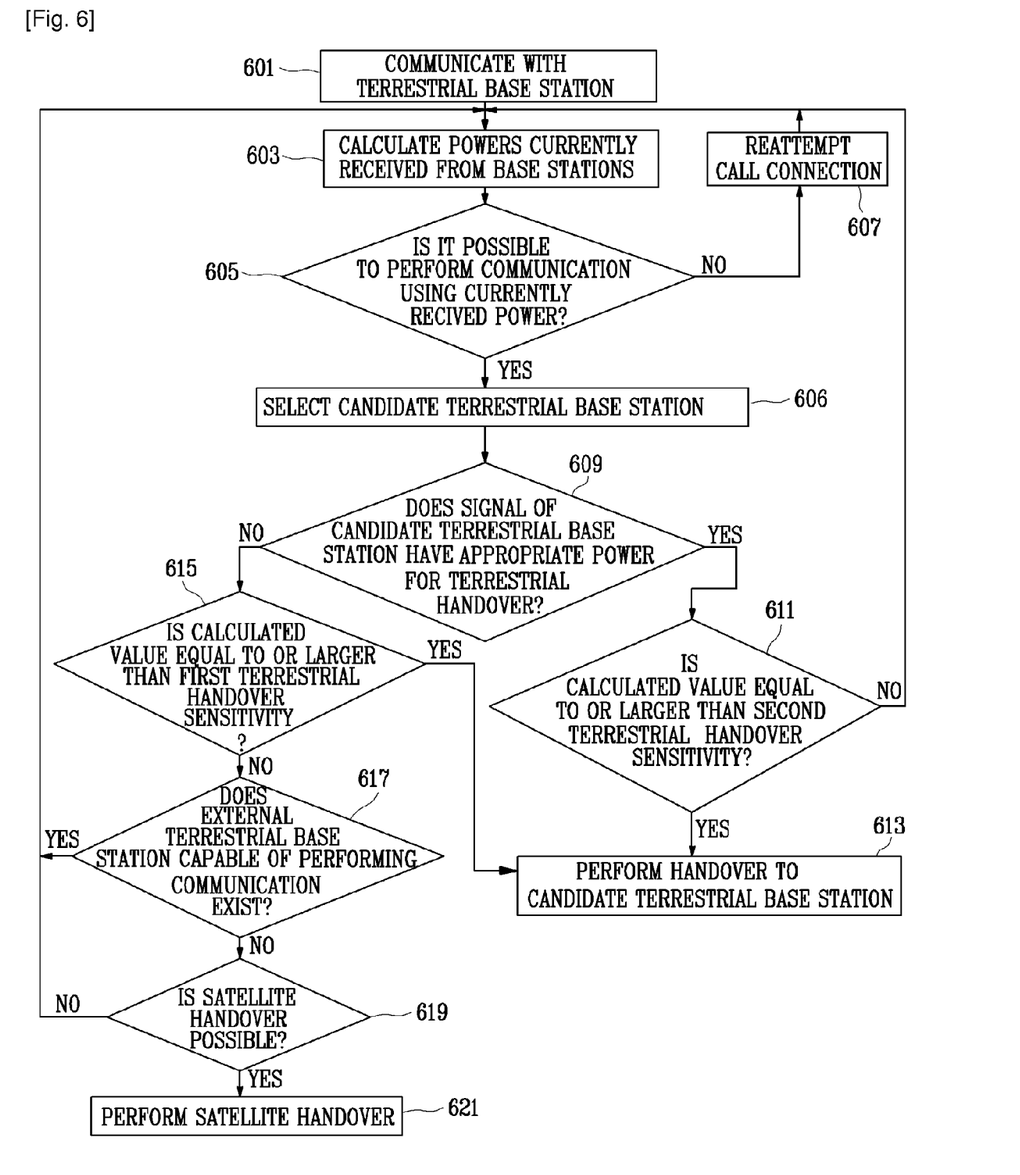
FIG. 6 is a flowchart showing a handover method for a case in which communication begins within the coverage of a terrestrial base station according to an exemplary embodiment of the present invention.

FIG. 6 is a flowchart showing a handover method for a case in which communication begins within the coverage of a terrestrial base station according to an exemplary embodiment of the present invention.

Referring to FIG. 6, it can be seen from the cases illustrated in FIGS. 2 to 5 that a case in which a mobile communication terminal moves from a terrestrial base station's coverage and then handover is performed is different from a case in which a mobile communication terminal moves from a satellite's coverage and then handover is performed. Therefore, the respective cases are classified. The case in which communication begins in a terrestrial base station's coverage will be described with reference to FIG. 6, and the other case in which communication begins in a communication satellite's coverage will be described with reference to FIG. 7.

First, a mobile communication terminal communicates with a terrestrial base station (step 601). Then, power levels transmitted from the currently communicating base station and other base stations capable of communicating with the mobile communication terminal, and a power level received from a communication satellite, are calculated. By the calculation, signal powers currently received from all base stations are obtained (step 603). Subsequently, it is determined whether it is possible to perform communication using the signal power received from the currently communicating base station (step 605). When it is not possible to perform communication using the signal power, a call connection is attempted again (step 607). Otherwise, an appropriate candidate terrestrial base station for handover is selected from terrestrial base stations except the currently communicating base station (step 606).

Here, whether it is possible to perform communication using the signal power received from the currently communicating base station is checked by determining whether the signal power of the communicating base station is higher than the communication-enabling power Pth described in FIG. 1. When the signal power of the base station is higher than the maximum handover power Pmax described in FIG. 1, there is no need to perform handover.

Subsequently, it is determined whether the signal of the candidate base station has appropriate power for terrestrial handover (step 609). When the signal power is appropriate for terrestrial handover, it is checked whether a value calculated by subtracting the power received from the currently communicating base station from the power received from the candidate base station is equal to or larger than a second terrestrial handover sensitivity (step 611). When the value is larger than the second terrestrial handover sensitivity, handover is performed to the candidate terrestrial base station (step 613). On the contrary, when the value is smaller than the second terrestrial handover sensitivity, the process goes back to step 603.

Meanwhile, when it is determined in step 609 that the signal power is not appropriate for terrestrial handover, it is checked whether the value calculated by subtracting the power received from the currently communicating base station from the power received from the candidate base station is equal to or larger than a first terrestrial handover sensitivity (step 615). When the calculated value is equal to or larger than the first terrestrial handover sensitivity, handover is performed to the candidate terrestrial base station (step 613).

On the contrary, when the calculated value is smaller than the first terrestrial handover sensitivity, it is checked again whether an external base station capable of performing communication with the mobile communication terminal exists (step 617). When there is no external base station to which handover can be performed, it is also checked whether satellite handover is possible (step 619). When all the conditions are satisfied, satellite handover is performed (step 621).

Here, when any condition of steps 617 and 619 is not satisfied, the process goes back to step 603.

Meanwhile, whether the signal of the candidate base station has appropriate power for terrestrial handover is checked by determining whether the power received from the currently communicating base station is higher than the minimum handover power Pmin described in FIG. 1. In addition, a first terrestrial handover sensitivity value M is set to a value that is equal to or smaller than a second terrestrial handover sensitivity value M.

In addition, whether an external base station capable of performing communication with the mobile communication terminal exists is checked by determining whether a variation of a power received by the mobile communication terminal is larger than a predetermined reference variation, and whether there is another base station whose signal power is higher than the communication-enabling power Pth.

In this way, it is possible to determine handover for the cases of FIGS. 2 to 5 more desirably than by a conventional handover determination method.

Figure 7:
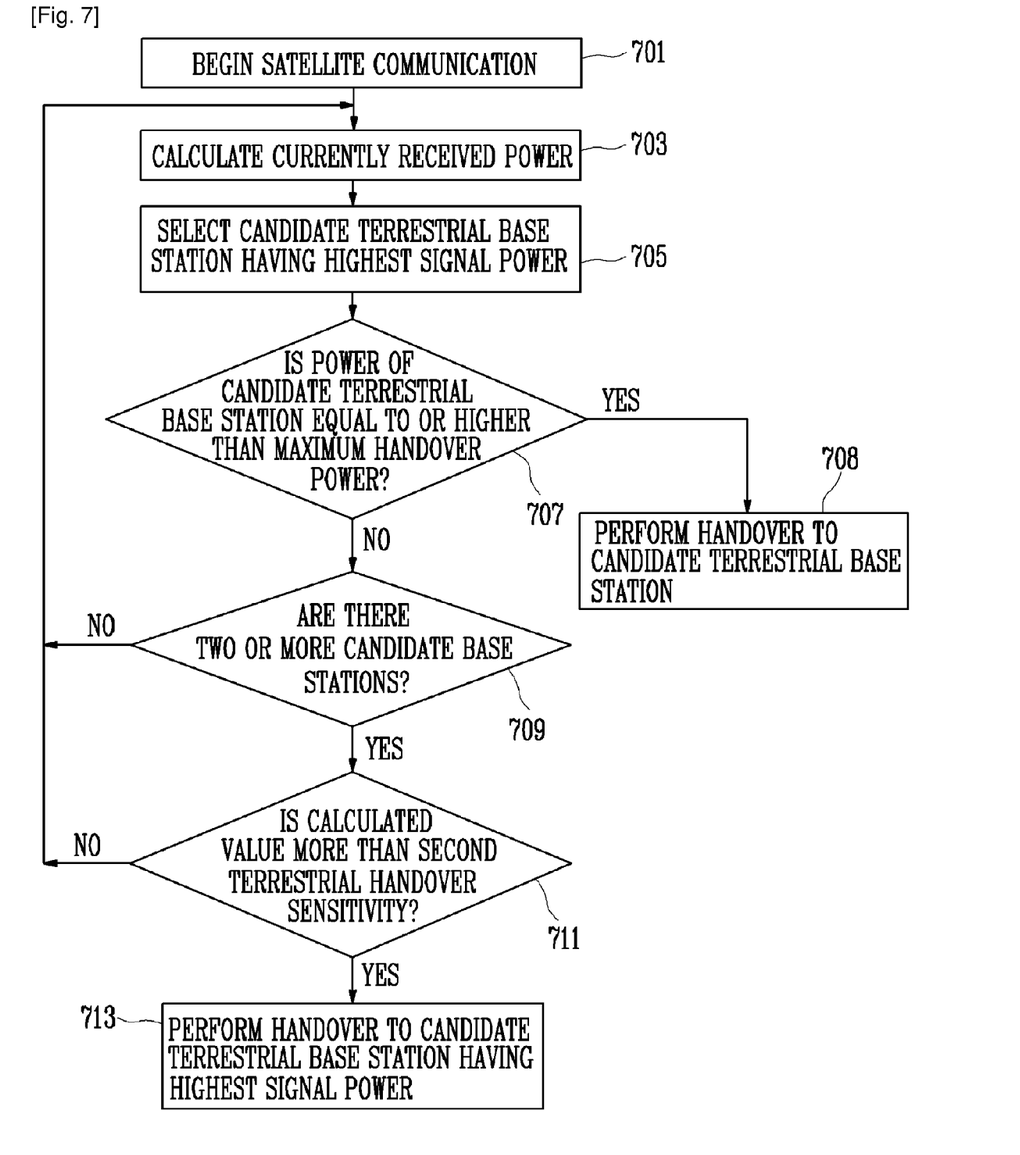
FIG. 7 is a flowchart showing a handover method for a case in which communication begins within the coverage of a communication satellite according to an exemplary embodiment of the present invention.

FIG. 7 is a flowchart showing a handover method for a case in which communication begins within the coverage of a communication satellite according to an exemplary embodiment of the present invention.

Referring to FIG. 7, first, a mobile communication terminal begins communication with a satellite (step 701). Then, the signal power received from the communication satellite is calculated (step 703), and a candidate terrestrial base station having the highest signal power is selected from candidate terrestrial base stations to which handover can be performed (step 705). Subsequently, it is determined whether the power of the selected candidate terrestrial base station is equal to or higher than the maximum handover power (step 707). When the power of the selected candidate terrestrial base station is equal to or higher than the maximum handover power, handover is performed to the selected candidate terrestrial base station (step 708).

Meanwhile, when the power of the selected candidate terrestrial base station is lower than the maximum handover power, it is determined whether there are a plurality of candidate terrestrial base stations to which handover can be performed (step 709). When there are a plurality of candidate terrestrial base stations to which handover can be performed, it is determined whether a value calculated by subtracting the currently received power from the power received from the selected base station is larger than a second terrestrial handover sensitivity (step 711). When the calculated value is larger than the second terrestrial handover sensitivity, handover is performed to the selected base station (step 713).

In this way, it is possible to determine handover from a communication satellite to a terrestrial base station for the cases of FIGS. 3 to 5 more desirably than by using a conventional method.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A handover method for a mobile communication terminal in a mobile communication network including at least one mobile communication base station and a communication satellite, the handover method comprising the steps of:
(a) calculating a signal power received from a currently communicating mobile communication base station among the at least one mobile communication base station;
(b) calculating a signal power received from each of the communication satellite and the at least one mobile communication base station except the base station of step (a);
(c) selecting a mobile communication base station having the highest among the calculated signal powers except the signal power received from the communication satellite and the signal power received from the base station of step (a); and
(d) when the signal power calculated in step (a) is below a predetermined minimum handover power, a difference between the signal power of the selected mobile communication base station and the signal power calculated in step (a) is equal to or below a first terrestrial handover sensitivity, and there is no other mobile communication base station capable of communicating with the mobile communication terminal, performing handover to the communication satellite.

2. The handover method of claim 1, further comprising the step of: when the signal power of step (a) is equal to or above a maximum handover power, not performing handover.

3. The handover method of claim 1, further comprising the step of: when the signal power of step (a) is equal to or below a call-enabling power, reattempting a call.

4. The handover method of claim 1, further comprising the step of: when the signal power of step (a) is equal to or above the predetermined minimum handover power, and the difference between the signal power of the mobile communication base station selected in step (c) and the signal power of step (a) is equal to or above a second terrestrial handover sensitivity, performing handover to the mobile communication base station of step (c).

5. The handover method of claim 4, wherein the first terrestrial handover sensitivity is equal to or below the second terrestrial handover sensitivity.

6. The handover method of claim 1, wherein the existence of another mobile communication base station capable of communicating with the mobile communication terminal is checked by determining whether the variation of powers calculated in step (b) is equal to or above a predetermined reference variation, and the power calculated in step (b) is equal to or above a call-enabling power.

7. The handover method of claim 6, wherein the predetermined reference variation is set to a value larger than 0.

8. The handover method of claim 1, wherein the first terrestrial handover sensitivity and second terrestrial handover sensitivity can be previously determined together with a handover hysteresis margin used by a terrestrial base station to determine handover.

9. A handover method for a mobile communication terminal in a mobile communication network including at least one mobile communication base station and a communication satellite, the handover method comprising the steps of:
(a) calculating a signal power received from the communication satellite;
(b) calculating a signal power received from each of the at least one mobile communication base station;
(c) selecting mobile communication base stations having a higher signal power than a minimum handover power among the calculated signal powers;
(d) selecting a mobile communication base station having the highest among the received signal powers of the selected mobile communication base stations; and
(e) when the signal power of the mobile communication base station of step (d) is equal to or below a maximum handover power, a plurality of mobile communication base stations are selected in step (c), and a difference between the signal power of the mobile communication base station selected in step (d) and the signal power of step (a) is equal to or above a second terrestrial handover sensitivity, performing handover to the mobile communication base station of step (d).

10. The handover method of claim 9, wherein when the received power of the mobile communication base station of step (d) is equal to or above the maximum handover power, handover is performed to the mobile communication base station of step (d).

11. A mobile communication terminal for performing handover to a communication satellite and a mobile communication base station in a mobile communication network including at least one mobile communication base station and the communication satellite, the mobile communication terminal comprising:
a communication power calculator for calculating a signal power received from a currently communicating mobile communication base station among the at least one mobile communication base station;
a signal power calculator for calculating a signal power received from each of the communication satellite and the at least one mobile communication base station except the communicating mobile communication base station;
a base station selector for selecting a mobile communication base station having a highest signal power among the powers calculated by the signal power calculator except the signal power received from the communication satellite and the power calculated by the communication power calculator; and a handover unit for performing handover to the communication satellite when the signal power calculated by the communication power calculator is below a predetermined minimum handover power, a difference between the signal power of the mobile communication base station selected by the base station selector and the signal power calculated by the communication power calculator is equal to or below a first terrestrial handover sensitivity, and there is no other mobile communication base station capable of communicating with the mobile communication terminal.

12. The mobile communication terminal of claim 11, wherein when the signal power calculated by the communication power calculator is equal to or above a maximum handover power, handover is not performed.

13. The mobile communication terminal of claim 11, wherein when the signal power calculated by the communication power calculator is equal to or below a call-enabling power, a call is reattempted.

14. The mobile communication terminal of claim 11, wherein when the signal power calculated by the communication power calculator is equal to or above the predetermined minimum handover power, and the difference between the signal power of the mobile communication base station selected by the base station selector and the signal power calculated by the communication power calculator is equal to or above a second terrestrial handover sensitivity, handover is performed to the mobile communication base station selected by the base station selector.

15. The mobile communication terminal of claim 11, wherein the existence of another mobile communication base station capable of communicating with the mobile communication terminal is checked by determining whether a variation of the powers calculated by the signal power calculator is equal to or above a predetermined reference variation, and whether the power calculated by the signal power calculator is equal to or above a call-enabling power.

16. A mobile communication terminal for performing handover to a communication satellite and a mobile communication base station in a mobile communication network including at least one mobile communication base station and the communication satellite, the mobile communication terminal comprising:

a communication power calculator for calculating a signal power received from the communication satellite;

a signal power calculator for calculating a signal power received from each of the at least one mobile communication base station;

a candidate base station selector for selecting mobile communication base stations having a signal power equal to or above a minimum handover power among the signal powers calculated by the signal power calculator;

a highest power base station selector for selecting a mobile communication base station having the highest among the received signal powers of the mobile communication base stations selected by the candidate base station selector; and a handover unit for performing handover to the mobile communication base station selected by the highest power base station selector when the received power of the mobile communication base station selected by the highest power base station selector is equal to or below a maximum handover power, a plurality of mobile communication base stations are selected by the candidate base station selector, and a difference between the signal power of the mobile communication base station selected by the highest base station selector and the signal power calculated by the communication power calculator is equal to or above a second terrestrial handover sensitivity.

17. The mobile communication terminal of claim 16, wherein when the received power of the mobile communication base station selected by the highest power base station selector is equal to or above the maximum handover power, handover is performed to the mobile communication base station selected by the highest power base station selector.

* * * * *